(12) United States Patent
Lau

(10) Patent No.: US 7,219,550 B2
(45) Date of Patent: May 22, 2007

(54) PIEZOELECTRIC ACCELEROMETER

(76) Inventor: Michael Ping Cheung Lau, Flat A, 32nd Floor, Block 1, Le Sommet, 28 Fortress Hill Road, Kowloon (HK)

( * ) Notice: Subject to any disclaimer, the term of this patent is extended or adjusted under 35 U.S.C. 154(b) by 0 days.

(21) Appl. No.: 11/356,290

(22) Filed: Feb. 17, 2006

(65) Prior Publication Data

US 2006/0179944 A1    Aug. 17, 2006

Related U.S. Application Data

(60) Provisional application No. 60/653,519, filed on Feb. 17, 2005.

(51) Int. Cl.
*G01P 15/09* (2006.01)
*H01L 41/22* (2006.01)
(52) U.S. Cl. .................. 73/514.34; 310/311
(58) Field of Classification Search ............ 73/514.34, 73/514.33, 514.16, 514.29, 493; 29/25.35; 310/311, 326, 327, 340, 345, 364, 366
See application file for complete search history.

(56) References Cited

U.S. PATENT DOCUMENTS 4,354,134 A * 10/1982 Micheron .................. 310/328
4,532,450 A *  7/1985 McNeel et al. ............. 310/329
6,615,465 B2 *  9/2003 Otsuchi et al. ............. 29/25.35
6,681,631 B2 *  1/2004 Apel ........................ 73/514.34

* cited by examiner

*Primary Examiner*—Helen Kwok
(74) *Attorney, Agent, or Firm*—Rabin & Berdo, P.C.

(57) ABSTRACT

A piezoelectric accelerometer comprising a housing with two complementary parts (2005, 2006) in which a metal mass (2002) and an abutting piezoelectric element (2003) movably mounted in place are sandwiched between two conductive contact elements (2001, 2004), wherein the metal mass (2002) is in intimate contact with the piezoelectric element (2003) and the two conductive contact elements (2001, 2004) act as the electric terminals for connecting the accelerometer to any external electronic circuit for further processing.

10 Claims, 3 Drawing Sheets

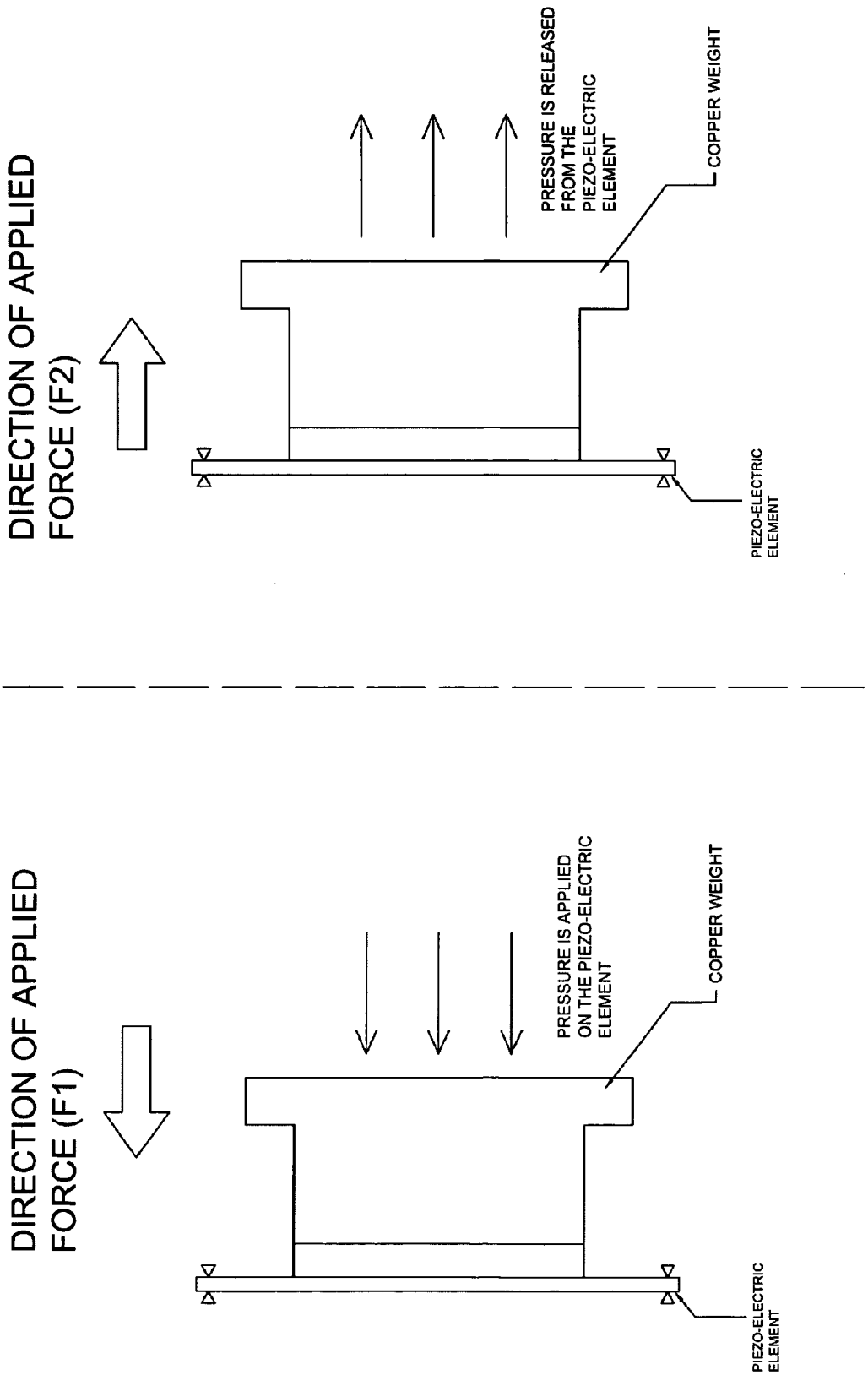

PIEZOELECTRIC ACCELEROMETER

CROSS-REFERENCE TO RELATED APPLICATION

This application claims the benefit of U.S. Provisional application No. 60/653,519, filed Feb. 17, 2005.

FIELD OF THE INVENTION

The present invention relates to an accelerometer, in particular a low cost piezoelectric accelerometer with high sensitivity and simple means.

BACKGROUND OF THE INVENTION

It is well known that across the terminals of a piezoelectric element a voltage can be induced when a pressure is applied thereto. In this connection, a basic piezoelectric accelerometer can be further constituted by comprising a piezoelectric element to which two wires being soldered whereby forming the terminals for connection with an electronic signal processing circuit for further processing; and a housing having a chamber in which the piezoelectric element is mounted. A disadvantage thereof is that the mass of such a piezoelectric element is relatively small, thereby the voltage produced therefrom is inadequate for further processing and a relatively high acceleration is required.

Further, the heat from soldering of the wires and the size of the solder joints could adversely affect the characteristics of the piezo and such an accelerometer can be only used at temperature lower than the melting point of the solder, thereby it is unreliable and of limited use.

SUMMARY OF THE INVENTION

It is therefore an object of the present invention to eliminate the foregoing drawbacks in the prior art and provide a low cost piezoelectric accelerometer with high sensitivity and reliability while no wire or solder is required on the piezoelectric element thereof.

In order to realize the above object, the present invention provides a piezoelectric accelerometer comprising a housing with two complementary parts whereby forming a chamber in which a metal mass, an abutting piezoelectric element movably mounted in place and two conductive contact elements are provided, characterized in that: the metal mass is in intimate contact with the piezoelectric element for improving the efficiency and sensitivity thereof and both of which are sandwiched in an elastic manner between the two conductive contact elements acting as the electric terminals for connecting the accelerometer to any external electronic circuit for further processing, thereby no adhesive, wire or solder is required.

Preferably, the metal mass is a nickel plated copper weight or a metal weight with excellent conductivity and the two conductive contact elements are gold plated disc springs or the like.

Preferably, in between the metal mass and the piezoelectric element a small clearance exists in the absence of one of the conductive contact element and the clearance thereof is approximately 0.2 mm.

For the better understanding of the present invention, the teachings, specific configurations and the technical effects thereof will be described in further details below with reference to the drawings.

BRIEF DESCRIPTION OF THE DRAWINGS

FIG. 3 is a schematic view of the assembled embodiment of FIG. 2 illustrating the working principle thereof.

DETAILED DESCRIPTION OF THE INVENTION

Figure 1:
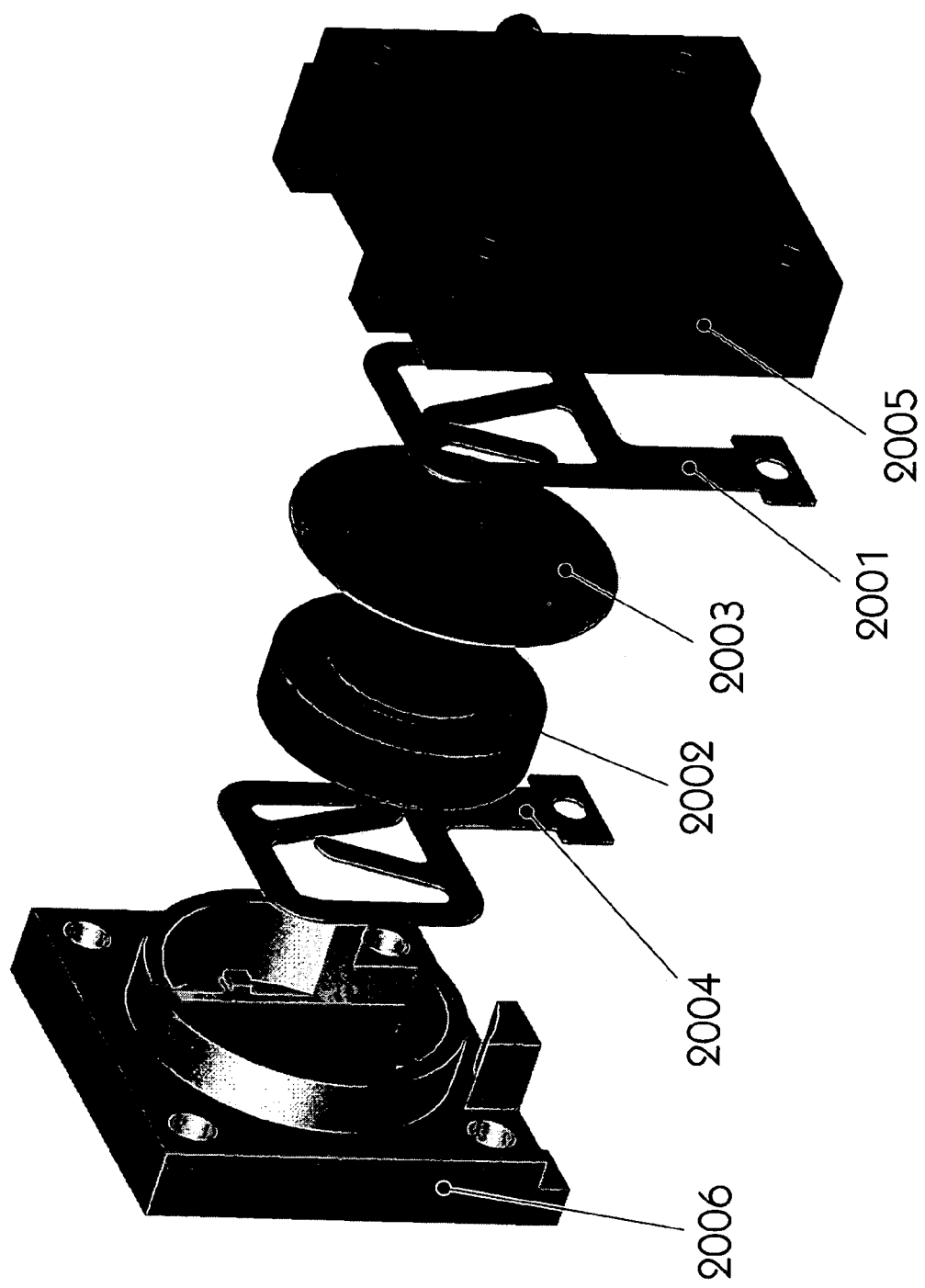
FIG. 1 is a stereoscopic exploded view of an embodiment of the present invention.
Figure 2:
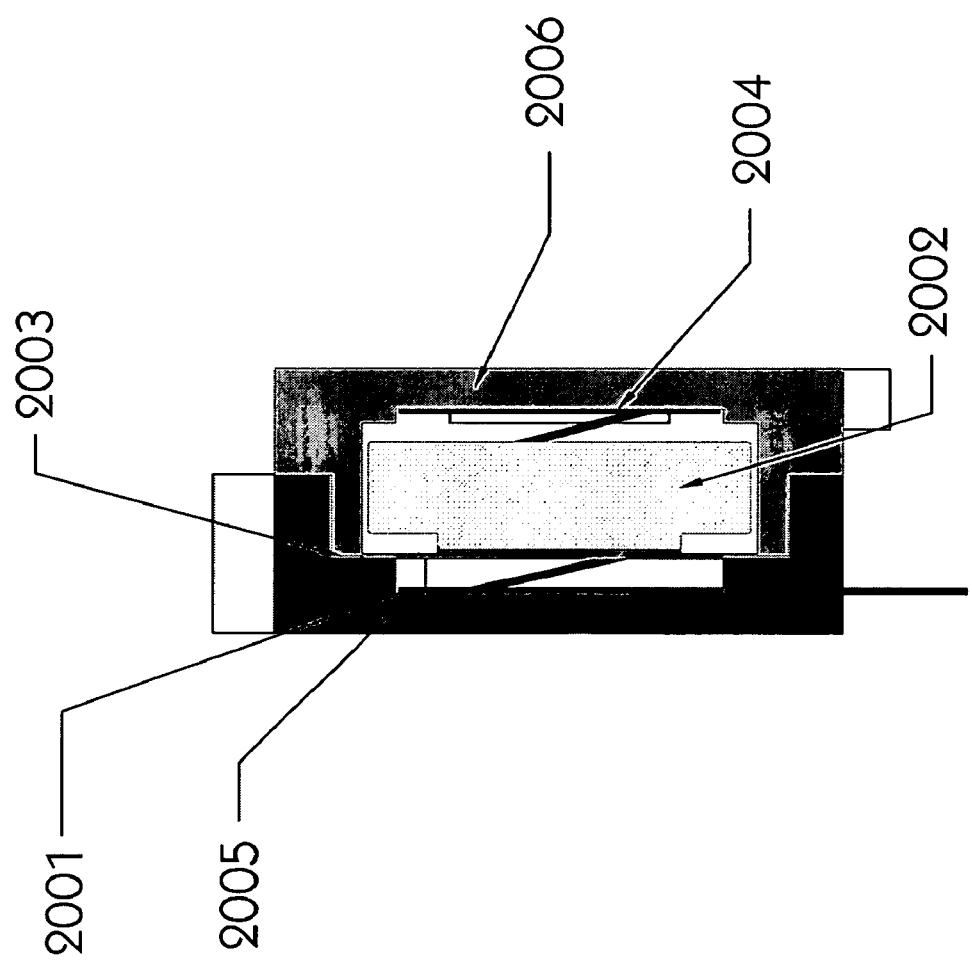
FIG. 2 is a sectional view of the assembled embodiment shown in FIG. 1.

FIG. 1 and FIG. 2 respectively illustrate a stereoscopic exploded and sectional view of an embodiment of the present invention. According to the embodiment of present invention, the accelerometer comprises a plastic housing having two complementary parts (2005, 2006) joined together by means of screws and/or adhesive, thereby forming a chamber in which a metal mass (2002) and an abutting piezoelectric element (2003) movably mounted in place being sandwiched in an elastic manner between two conductive contact elements (2001, 2004) which are in turn firmly mounted in respective part (2005, 2006) of the housing.

In this embodiment, the housing is made of plastic material for the cost-effectiveness thereof. Alternatively, it can adaptively be made of other suitable materials with a much higher melting point for higher temperature applications.

Wherein the piezoelectric element (2003) is mounted movably in place in such a manner that it will only displace slightly in an elastic manner while being subjected to acceleration in any direction, and the metal mass (2002) is in intimate contact with the piezoelectric element (2003) for improving the efficiency and sensitivity thereof. The two conductive contact elements (2001, 2004) act as the electric terminals for connecting the accelerometer to any external electronic circuit for further processing. In this embodiment, a nickel plated copper weight (2002) is used as the metal mass and the two conductive contact elements (2001, 2004) are gold plated disc springs.

Between the copper weight (2002) and the piezoelectric element (2003) a small clearance exists in the absence of the conductive contact element (2004) and the clearance is approximately 0.2 mm thereby ensuring both of which can be slightly displaced therebetween in an elastic and limiting manner. The intimate contact between the metal mass (2002) and the piezoelectric element (2003) is by virtue of the spring force provided by the two disc springs thereby ensuring the electrical coupling thereof. When the accelerometer is subjected to acceleration in a direction, the inertial force of the copper weight (2002) introduces strain in the piezoelectric element (2003). Such force will vary in magnitude and direction in accordance to the direction of acceleration.

FIG. 3 illustrates a schematic view of the assembled embodiment of FIG. 2 by which the working principle thereof is presented. While the accelerometer is subjected to acceleration in the direction of applied force F1, the copper weight (2002) will be pushed toward the piezoelectric element (2003) mounted movably in the housing thereby causing an increase in pressure in the piezoelectric element. Consequently, an electric output voltage with a magnitude and phase in accordance with the acceleration is introduced.

Alternatively, while the accelerometer is subjected to acceleration in the direction of applied force F2 that is opposed to F1, the copper weight (2002) will be pulled back from the piezoelectric element (2003) thereby causing a decrease in pressure in the piezoelectric element (2003). Consequently, an electric output voltage with a magnitude and phase in accordance with the acceleration or the direction of F2 is introduced in a same manner.

It should be understood that present invention is not limited to above merely exemplary embodiments, and many corresponding modifications as well as variations are also possible and can be made by a person skilled in the art as according to the teachings of the present invention, while such modifications and variations fall into the scope of the claims of the present invention.

What is claimed is:

1. A piezoelectric accelerometer, comprising:
a housing with two complementary parts (2005, 2006) thereby forming a chamber in which a metal mass (2002), an abutting piezoelectric element (2003) movably mounted in place and two conductive contact elements (2001, 2004) are provided, the metal mass (2002) being in intimate contact with the piezoelectric element (2003) for improving the efficiency and sensitivity thereof and both of which being sandwiched in an elastic manner between the two conductive contact elements (2001, 2004) acting as electric terminals for connecting the accelerometer to any external electronic circuit such that no adhesive, wire or solder is required.

2. A piezoelectric accelerometer as claimed in claim 1, wherein the metal mass is a nickel plated copper weight.

3. A piezoelectric accelerometer as claimed in claim 1, wherein the two conductive contact elements (2001, 2004) are gold plated disc springs.

4. A piezoelectric accelerometer as claimed in claim 1, wherein between the metal mass (2002) and the piezoelectric element (2003) a small clearance exists in the absence of one of the conductive contact elements (2004).

5. A piezoelectric accelerometer as claimed in claim 2, wherein between the metal mass (2002) and the piezoelectric element (2003) a small clearance exists in the absence of one of the conductive contact elements (2004).

6. A piezoelectric accelerometer as claimed in claim 3, wherein between the metal mass (2002) and the piezoelectric element (2003) a small clearance exists in the absence of one of the conductive contact elements (2004).

7. A piezoelectric accelerometer as claimed in claim 4, wherein the clearance is approximately 0.2 mm.

8. A piezoelectric accelerometer as claimed in claim 5, wherein the clearance is approximately 0.2 mm.

9. A piezoelectric accelerometer as claimed in claim 6, wherein the clearance is approximately 0.2 mm.

10. A piezoelectric accelerometer, comprising:
a housing having two complementary parts which are fastenable together to form a chamber therebetween;
a metal mass movably disposed in the chamber;
a piezoelectric element movably disposed in the chamber and being located adjacent to, and in direct contact with, said metal mass;
a first conductive contact element disposed between said piezoelectric element and one of the complementary parts, said first conductive contact element including a first spring portion that contacts and pushes against said piezoelectric element, and including a first electric terminal for connecting the accelerometer to an external electronic circuit; and
a second conductive contact element disposed between said metal mass and another one of the complementary parts, said second conductive contact element including a second spring portion that contacts and pushes against said metal mass, and including a second electric terminal for connecting the accelerometer to the external electronic circuit.

* * * * *